US012793925B2

(12) United States Patent
Wang et al.

(10) Patent No.: US 12,793,925 B2
(45) Date of Patent: Nov. 10, 2026

(54) RADIATION INSPECTION SYSTEM AND METHOD

(71) Applicant: NUCTECH COMPANY LIMITED, Beijing (CN)

(72) Inventors: Weizhen Wang, Beijing (CN); Bicheng Liu, Beijing (CN); Chunguang Zong, Beijing (CN); Shangmin Sun, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 364 days.

(21) Appl. No.: 18/575,257

(22) PCT Filed: Jul. 1, 2022

(86) PCT No.: PCT/CN2022/103231

§ 371 (c)(1),
(2) Date: Dec. 28, 2023

(87) PCT Pub. No.: WO2023/280056

PCT Pub. Date: Jan. 12, 2023

(65) Prior Publication Data

US 2024/0312753 A1 Sep. 19, 2024

(30) Foreign Application Priority Data

Jul. 9, 2021 (CN) ......................... 202110777658.3

(51) Int. Cl.
*H01J 25/50* (2006.01)
*G01N 23/04* (2018.01)
(Continued)

(52) U.S. Cl.
CPC .............. *H01J 25/50* (2013.01); *G01N 23/04* (2013.01); *G01N 23/083* (2013.01); *H05H 9/00* (2013.01); *G01N 2223/20* (2013.01)

(58) Field of Classification Search
CPC ....... H01J 25/50; G01N 23/04; G01N 23/083; G01N 2223/20; H05H 9/00; H05H 9/048; G01V 5/22; G01V 11/00
See application file for complete search history.

(56) References Cited

U.S. PATENT DOCUMENTS

2011/0006708 A1* 1/2011 Ho .......................... H05H 9/04 315/505
2015/0325401 A1 11/2015 Langeveld et al.
(Continued)

FOREIGN PATENT DOCUMENTS

CN 1144039 C 3/2004
CN 1995993 A 7/2007
(Continued)

OTHER PUBLICATIONS

ISR received in PCT/CN2022/103231; mailed Oct. 10, 2022.
(Continued)

*Primary Examiner* — Courtney D Thomas
(74) *Attorney, Agent, or Firm* — Kilpatrick Townsend & Stockton LLP

(57) ABSTRACT

A radiation inspection system includes: a single ray source having a plurality of accelerating tubes, and the plurality of accelerating tubes respectively generate a plurality of rays having different energies, and beam exit directions of the plurality of accelerating tubes comprise at least two different beam exit directions; a plurality of detectors configured to detect a signal when rays emitted by the single ray source act on the inspected object; and a processor in communication connection with the single ray source and configured to respectively control the plurality of accelerating tubes. A radiation inspection method is also provided.

18 Claims, 4 Drawing Sheets

(51) Int. Cl.
*G01N 23/083* (2018.01)
*H05H 9/00* (2006.01)

(56) References Cited

U.S. PATENT DOCUMENTS

| | | | | |
|---|---|---|---|---|
| 2016/0135278 A1* | 5/2016 | Sun | H05H 9/048 378/57 |
| 2018/0270941 A1 | 9/2018 | Nighan, Jr. et al. | |

FOREIGN PATENT DOCUMENTS

| | | | |
|---|---|---|---|
| CN | 101076218 | A | 11/2007 |
| CN | 102105815 | A | 6/2011 |
| CN | 101470084 | B | 12/2011 |
| CN | 203416494 | U | 1/2014 |
| CN | 103926261 | A | 7/2014 |
| CN | 104101910 | A | 10/2014 |
| CN | 104374785 | A | 2/2015 |
| CN | 104749198 | A | 7/2015 |
| CN | 103226114 | B | 9/2015 |
| CN | 106455288 | A | 2/2017 |
| CN | 113238293 | A | 8/2021 |
| CN | 113238297 | A | 8/2021 |
| CN | 113238298 | A | 8/2021 |
| CN | 113281821 | A | 8/2021 |
| CN | 113329552 | A | 8/2021 |
| WO | 2016164411 | A1 | 10/2016 |

OTHER PUBLICATIONS

Written Opinion of the ISA received in PCT/CN2022/103231; mailed Oct. 10, 2022.

First OA received in CN Application No. 202110777658.3; mailed Aug. 17, 2021.

Second OA received in CN Application No. 202110777658.3; mailed Sep. 15, 2021.

Grant Notice received in CN Application No. 202110777658.3; mailed Oct. 9, 2021.

The Extended European Search Report issued in European corresponding application No. 22836807.2 mailed on May 28, 2025, 8 pages.

* cited by examiner

RADIATION INSPECTION SYSTEM AND METHOD

CROSS-REFERENCES TO RELATED APPLICATIONS

The present disclosure is a national phase application of International Application No. PCT/CN2022/103231, filed on Jul. 1, 2022, which claims priority to Chinese Application No. 202110777658.3, filed on Jul. 9, 2021, the entireties of which are herein incorporated by reference.

FIELD

The present disclosure relates to the field of radiation inspection, in particular to a radiation inspection system and method.

BACKGROUND

In some related technologies, a container/vehicle inspection system includes a single-view scanning system and a multi-view scanning system. As to the single-view scanning system, rays are emitted from one side of an inspected object to the inspected object, to generate a scanned image, and the obtained scanned image is superimposition of all the information on a path of the rays passing through the inspected object. As to the multi-view scanning system, rays are emitted to the inspected object from several different directions of the inspected object, to generate scanned images in different views, to obtain richer information of the inspected object, and easily find prohibited goods.

For a multi-view scanning system, in some related technologies, a plurality of ray sources are adopted to emit rays to the inspected object respectively in different views. In some other related technologies, rays are emitted in different views by moving ray sources through a mechanical structure.

SUMMARY

The inventor found through researches that, a multi-view scanning system having a plurality of ray sources in the related technology has more parts, greater total weight and higher cost, while the multi-view scanning system in which a mechanical structure is adopted to move a ray source is more complex in the mechanical structure.

In view of this, embodiments of the present disclosure provide a radiation inspection system and method capable of satisfying the requirements of multi-view scanning and reducing system complexity.

One aspect of the present disclosure provides a radiation inspection system, including: a single ray source having a plurality of accelerating tubes, and the plurality of accelerating tubes respectively generate a plurality of rays having different energies, and beam exit directions of the plurality of accelerating tubes include at least two different beam exit directions; a plurality of detectors configured to detect a signal when rays emitted by the single ray source act on the inspected object; and a processor in communication connection with the single ray source and configured to respectively control the plurality of accelerating tubes.

In some embodiments, a portion of the plurality of accelerating tubes is configured to generate a ray pulse having a first energy, another portion of the plurality of accelerating tubes is configured to selectively generate a ray pulse having a second energy and a ray pulse having a third energy, the first energy is lower than the second energy, and the second energy is lower than the third energy.

In some embodiments, the first energy is less than 1 MeV, the second energy and the third energy are both greater than 1 MeV.

In some embodiments, the single ray source further includes: an electronic beam generating device configured to generate a plurality of electronic beams; a microwave generating device configured to generate a microwave; a microwave circulator having a power input port and at least two power output ports, the power input port being connected with the microwave generating device through a waveguide structure; and a controller in signal connection with the processor, the electronic beam generating device and the microwave generating device and configured to perform, according to instructions of the processor, chronological control on microwave power of the microwave generating device and perform chronological control on beam loadings generated by the electronic beam generating device and respectively corresponding to electronic beams of the plurality of accelerating tubes, and the plurality of accelerating tubes are connected with the electronic beam generating device, and are respectively connected with the at least two power output ports, and are configured to respectively receive a plurality of electronic beams generated by the electronic beam generating device, and respectively accelerate the plurality of electronic beams through microwaves received from the at least two power output ports, to respectively generate a plurality of radiation pulses having different radiation energies.

In some embodiments, the single ray source includes: a first electronic gun configured to generate a first electronic beam; a first electronic gun power source in signal connection with the controller and connected with the first electronic gun and configured to adjust a beam loading of the first electronic beam according to a chronological control signal provided by the controller; a second electronic gun configured to generate a second electronic beam; and a second electronic gun power source in signal connection with the controller, connected with the second electronic gun and configured to adjust a beam loading of the second electronic beam according to a chronological control signal provided by the controller, and the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

In some embodiments, at least two power output ports of the microwave circulator include a first power output port and a second power output port, the first power output port is allocated with a microwave signal fed from the power input port, and the second power output port is allocated with a microwave signal fed from the first power output port; and the plurality of accelerating tubes include: a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

In some embodiments, at least two power output ports of the microwave circulator further include a third power output port which is allocated with a microwave signal fed from the second power output port; and the single ray source further includes: an absorbing load connected with the third power output port and configured to absorb a microwave signal output by the third power output port.

In some embodiments, the microwave circulator includes a four-port circulator.

In some embodiments, the controller is configured to allow a microwave signal fed by the microwave generating device to the power input port of the microwave circulator to include at least one first input microwave signal at the first time period, and to allow the microwave signal fed by the microwave generating device to the power input port of the microwave circulator to include at least one second input microwave signal at the second time period, and a power of the at least one first input microwave signal is greater than that of the at least one second input microwave signal.

In some embodiments, the microwave generating device includes a magnetron.

In some embodiments, a beam exit direction of the first accelerating tube is different from a beam exit direction of the second accelerating tube, and the first accelerating tube and the second accelerating tube exit beams at different moments; and the detector includes a plurality of detector arrays; and the radiation inspection system further includes: a first accelerator chamber accommodating the first accelerating tube; a second accelerator chamber accommodating the second accelerating tube; at least one first detector arm mounted with a portion of the plurality of detector arrays; and at least one second detector arm mounted with another portion of the plurality of detector arrays, and the electronic beam generating device, the microwave generating device and the microwave circulator are all located in one of the first accelerator chamber and the second accelerator chamber.

In some embodiments, the first accelerator chamber and the at least one first detector arm are located in a first plane, the second accelerator chamber and the at least one second detector arm are located in a second plane, and the first plane is not coplanar with the second plane.

In some embodiments, the first plane is parallel to the second plane.

In some embodiments, the at least one first detector arm includes a first detector cross arm and a first detector vertical arm, and the at least one second detector arm includes a second detector cross arm, a second detector vertical arm and a third detector vertical arm; and the radiation inspection system further includes a supporting structure, the first accelerator chamber, the second accelerator chamber, the first detector cross arm and the second detector vertical arm are all connected with the supporting structure, the first detector vertical arm is located in opposed position of the supporting structure, the second detector cross arm is located on an underside of the second accelerator chamber, and the third detector vertical arm is located in opposed position of the second detector vertical arm.

In some embodiments, a beam exit direction of the first accelerating tube is different from a beam exit direction of the second accelerating tube, and the first accelerating tube and the second accelerating tube exit beams at different moments; and the detector includes a plurality of detector arrays, and the radiation inspection system further includes: a single accelerator chamber accommodating the first accelerating tube and the second accelerating tube; at least one first detector arm mounted with a portion of the plurality of detector arrays; at least one second detector arm mounted with another portion of the plurality of detector arrays; a first collimator located between the first accelerating tube and the at least one first detector arm, and configured to collimate a ray generated by the first accelerating tube to the at least one first detector arm; and a second collimator located between the second accelerating tube and the at least one second detector arm, and configured to collimate a ray generated by the second accelerating tube to the at least one second detector arm, and the electronic beam generating device, the microwave generating device and the microwave circulator are all located in the single accelerator chamber.

In some embodiments, the first accelerating tube, the first collimator and at least one first detector arm are located in a third plane, the second accelerating tube, the second collimator and the at least one second detector arm are located in a fourth plane, and the third plane forms an acute angle with the fourth plane.

In some embodiments, the single ray source is an electron linear accelerator.

One aspect of the present disclosure provides a radiation inspection method of the above radiation inspection system, and the radiation inspection method includes: causing a portion of a plurality of accelerating tubes to generate ray pulses having a first energy at a first moment of a scanning period; and receiving detection signals detected by a detector after the ray pulses having the first energy act on the inspected object, and judging whether the detection signal is lower than a preset threshold, if the detection signal is lower than the preset threshold, then causing another portion of the plurality of accelerating tubes to generate ray pulses having one of the second energy and the third energy which are both higher than the first energy at the next moment of the scanning period, otherwise, causing another portion of the plurality of accelerating tubes not to generate ray pulses at the next moment of the scanning period.

In some embodiments, the first energy is less than 1 MeV, the second energy and the third energy are both greater than 1 MeV, and the second energy is lower than the third energy.

Therefore, according to embodiments of the present disclosure, the processor controls a single ray source to emit ray pulses having different beam exit directions and different energies through a plurality of accelerating tubes, and detects signals by a plurality of detectors when rays emitted by the single ray source act on the inspected object, therefore, on one hand, the requirement of multi-view scanning is satisfied, and richer information of the inspected object is obtained, and on the other hand, there are fewer parts and lower system complexity.

BRIEF DESCRIPTION OF THE DRAWINGS

The accompanying drawings, which form part of the description, illustrate embodiments of the present disclosure and together with the description, serve to explain the principles of the present disclosure.

The present disclosure can be more clearly understood from the following detailed descriptions with reference to the accompanying drawings, in which.

It should be understood that the dimensions of various parts shown in the accompanying drawings are not drawn according to an actual scale relationship. In addition, the same or similar reference signs indicate the same or similar components.

DETAILED DESCRIPTION OF THE DISCLOSURE

Various exemplary embodiments of the present disclosure will now be described in detail with reference to the accompanying drawings. The descriptions of the exemplary embodiments are merely illustrative and are in no way intended to limit the present disclosure, and application or uses thereof. The present disclosure can be implemented in many different forms and is not limited to the embodiments described herein. These embodiments are provided, and the present disclosure will be thorough and complete, and will fully convey the scope of the present disclosure. It should be noted that unless otherwise specified, the relative arrangement of components and steps, the composition of materials, numerical expressions and numerical values set forth in these embodiments should be interpreted as merely illustrative and not as limitative.

Similar words of "first", "second" and the like used in the present disclosure do not indicate any order, quantity or importance, but are only used to distinguish different parts. Similar words such as "including" or "comprising" mean that the elements before the word cover the elements listed after the word, without excluding the possibility of covering other elements. "Upper", "lower", "left", "right" and the like are only used to indicate a relative positional relationship. After the absolute position of a described object changes, the relative positional relationship may also change accordingly.

In the present disclosure, when it is described that a specific device is located between a first device and a second device, there may be an intervening device between the specific device and the first device or the second device or not. When it is described that the specific device is connected to other devices, the specific device may be directly connected to the other devices without the intervening device, and may also have the intervening device without being directly connected to the other devices.

All terms (including technical terms or scientific terms) used in the present disclosure have the same meanings as those understood the art to which the present disclosure belongs, unless otherwise defined particularly. It should also be understood that the terms defined in, for example, general dictionaries should be interpreted as having the meanings consistent with their meanings in the context of the related art, and should not be interpreted in an idealized or extremely formal sense unless explicitly defined herein.

Technologies, methods and equipment known may not be discussed in detail, but the technologies, methods and equipment should be regarded as part of the description under appropriate circumstances.

Figure 1:
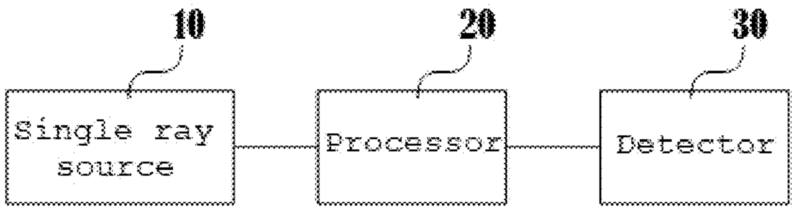
FIG. 1 is a block schematic diagram according to some embodiments of a radiation inspection system of the present disclosure.

FIG. 1 is a block schematic diagram according to some embodiments of a radiation inspection system of the present disclosure. Referring to FIG. 1, in some embodiments, the radiation inspection system includes: a single ray source 10, a plurality of detectors 30 and a processor 20. Objects inspected by the radiation inspection system herein can be goods and vehicles. During inspection, the inspected object and the radiation inspection system can move relatively. In some embodiments, the single ray source 10 keeps stationary, the inspected object 40 moves through its own power or is driven to move by other mechanisms. In some other embodiments, the inspected object 40 keeps stationary, and the single ray source 10 moves through its own power or is driven to move by other mechanisms.

The single ray source 10 has a plurality of accelerating tubes 13, the plurality of accelerating tubes 13 respectively generate a plurality of rays having different energies, and the beam exit directions of the plurality of accelerating tubes 13 include at least two different beam exit directions. The ray pulse emitted by the accelerating tubes 13 can be an X-ray pulse, and can also be a gamma-ray pulse.

In some embodiments, the single ray source is an electronic linear accelerator. The single ray source herein refers to the ray source using the same microwave source (e.g., the same magnetron). In some embodiments, the single ray source has a microwave source, a plurality of accelerating tubes and a plurality of electronic guns. To enable that beam exit directions of at least two accelerating tubes 13 in the plurality of accelerating tubes 13 are different, the accelerating tubes can be arranged at different directions and point to detectors located at different directions.

The plurality of detectors 30 are configured to detect a signal when rays emitted by the single ray source 10 act on the inspected object 40. In some embodiments, the detector 30 can be arranged on an opposite side of the accelerating tube 13 of the single ray source 10. For example, when the accelerating tube 13 emits an X-ray pulse, the X-ray is attenuated after penetrating through the inspected object 40 and is detected by the detector 30 located on the other side, to form a detection signal. An image reflecting contents inside the inspected object can be drawn according to the detection signal. The positions of the plurality of detectors 30 can be set according to positions of the accelerating tubes 13, correspondingly, a plurality of groups of detectors can be arranged for different accelerating tubes to detect respectively, and the setting positions of a plurality of groups of detectors are also correspondingly different.

The processor 20 is in communication connection with the single ray source 10, and is configured to respectively control the plurality of accelerating tubes 13. For example, the processor 20 can control the beam exit sequence, the beam exit frequency and energy of the plurality of accelerating tubes 13. Control of the single ray source 10 by the processor 20 herein can be performed based on sensing signals from other sensing units and pre-beam exit strategies.

In the present embodiment, the single ray source is controlled by a processor, and a plurality of accelerating tubes emit ray pulses having different beam exit directions and different energies, and detect signals by a plurality of detectors when rays emitted by the single ray source act on the inspected object, therefore, on one hand, the requirement of multi-view scanning is satisfied, to obtain richer information of the inspected object, and on the other hand, there are fewer parts and lower system complexity.

For a single ray source, at least two rays having different energies can be realized. For example, a portion of the plurality of accelerating tubes 13 is configured to generate a ray pulse having a first energy, and another portion of the plurality of accelerating tubes 13 is configured to selectively generate a ray pulse having a second energy and a ray pulse having a third energy. The first energy is lower than the second energy, and the second energy is lower than the third energy. The first energy can be less than 1 MeV, for example, 225 keV, 300 keV and 450 keV. The second energy and the third energy are both greater than 1 MeV, for example, 3 MeV and 6 MeV, 4 MeV and 6 MeV, 4 MeV and 7 MeV or 6 MeV and 9 MeV, etc. The ray pulses having different energies can serve as backup rays for improving penetrating power under different mass thickness conditions.

For different inspected objects, ray pulses having different energies can be provided through different accelerating tubes according to features of inspected objects. For example, through ray pulses having the first energy emitted by a portion of the accelerating tubes, radiation safety is improved and unnecessary energy loss is reduced. For another example, through ray pulses having the second energy and/or the third energy emitted by another portion of the accelerating tubes, quality of scanned images is improved, and richer information inside inspected objects is obtained.

For example, a classification of organic substances, inorganic substances and mixtures can be obtained through alternate scanning of a ray pulse of 3 MeV and a ray pulse of 6 MeV, or a classification of organic substances, inorganic substances, mixtures and heavy metals can be obtained through alternate scanning of a ray pulse of 6 MeV and a ray pulse of 9 MeV. Through ray pulses having different energies provided by different accelerating tubes, a better substance recognition function can be obtained, on one hand, a thick material area and a high-Z material area can be favorably recognized through ray pulses having a higher energy, and on the other hand, a thin material area and a low-Z material area can be favorably recognized through ray pulses having a lower energy.

Figure 2:
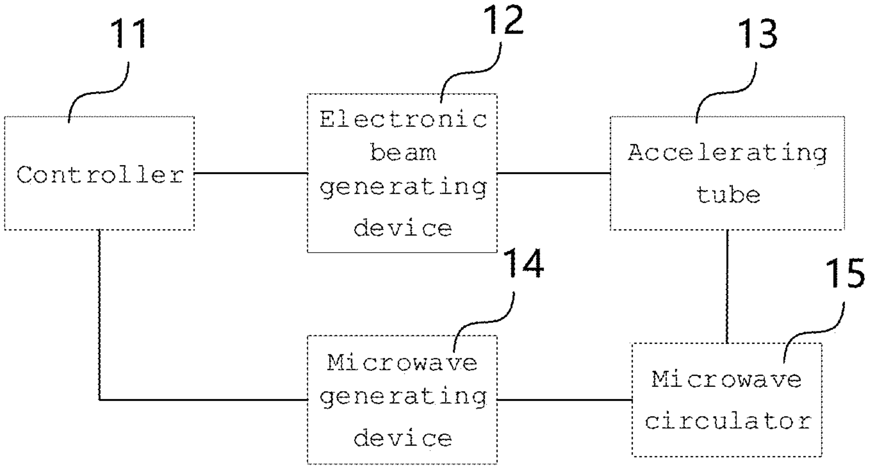
FIG. 2 is a block schematic diagram of a single ray source in some embodiments of a radiation inspection system of the present disclosure.

FIG. 2 is a block schematic diagram of a single ray source in some embodiments of a radiation inspection system of the present disclosure. Referring to FIG. 2, in some embodiments, the single ray source 10 includes: an electronic beam generating device 12, a microwave generating device 14, a microwave circulator 15, a plurality of accelerating tubes 13, and a controller 11. The electronic beam generating device 12 is configured to generate a plurality of electronic beams. In some embodiments, the electronic beam generating device 12 may cause a plurality of electronic guns to generate a plurality of electronic beams with the same or different beam loadings, respectively, by means of different high voltage amplitudes generated by a pulse modulator.

The microwave generating device 14 is configured to generate a microwave. In some embodiments, the microwave generating device 14 may generate varying operating currents by means of voltage of different amplitudes output from the pulse modulator, to generate microwave signals of different power. In some other embodiments, the microwave generating device 14 may also generate microwave signals of different power through variations of the magnetic field intensity. The microwave generating device 14 includes a magnetron 141.

The microwave circulator 15 has a power input port and at least two power output ports, and the power input port is connected to the microwave generating device 14 through a waveguide structure. The microwave circulator 15 has isolation characteristics and power allocation characteristics, and can transmit microwave energies along a single direction. By connecting the single microwave generating device 14 to the power input port of the microwave circulator 15, microwave energies fed from the power input port can be allocated to a specific power output port, and reflected microwave energies received by that power output port can be allocated to another power output port. By utilizing such characteristic of the microwave circulator 15 in conjunction with the chronological control of the microwave generating device 14, it is possible to achieve microwave energy output of more than two ports through the microwave generating device 14 as a single microwave power source.

The plurality of accelerating tubes 13 are connected to the electronic beam generating device 12, and connected to the at least two power output ports, respectively. The plurality of accelerating tubes 13 can receive a plurality of electronic beams generated by the electronic beam generating device 12, respectively, and accelerate the plurality of electronic beams respectively through the microwaves received from the at least two power output ports, to generate a plurality of rays having different energies, respectively. The accelerated electronic beams may generate rays, such as X-rays, by bombarding a target.

The controller 11 is in signal connection with the electronic beam generating device 12 and the microwave generating device 14, and is configured to perform chronological control on microwave power of the microwave generating device 14, and chronological control on beam loadings of the electronic beams generated by the electronic beam generating device 12 and respectively corresponding to the plurality of accelerating tubes 13. Through the chronological control performed by the controller 11 on the microwave generating device 14 and the electronic beam generating device 12, the plurality of accelerating tubes 13 can respectively generate rays of different energies through a microwave power source, to implement the inspection needs of multi-energy spectrum coverage of an object, and improving the wire resolution indexes of the system while ensuring the penetrability.

Figure 3:
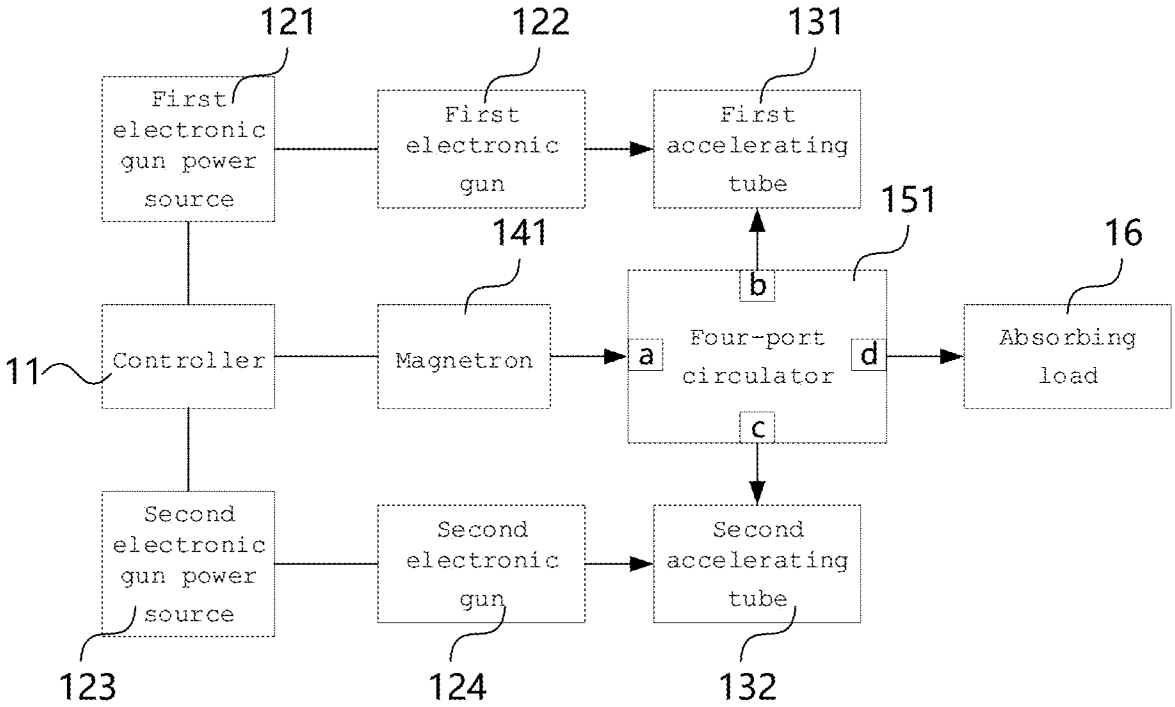
FIG. 3 is a block schematic diagram of a single ray source in some other embodiments of a radiation inspection system of the present disclosure.
Figure 4:
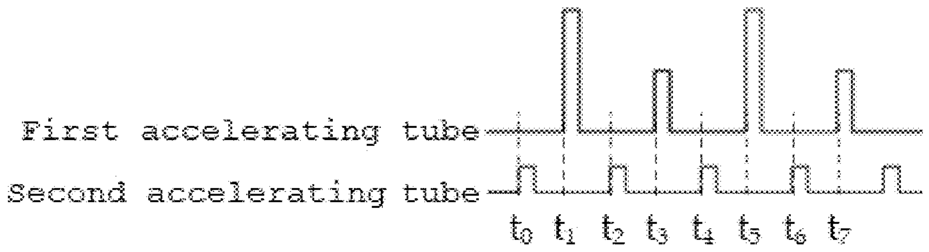
FIG. 4 is a schematic diagram showing beam exit manners of two accelerating tubes at different moments according to some embodiments of the radiation inspection system of the present disclosure.
Figure 5:
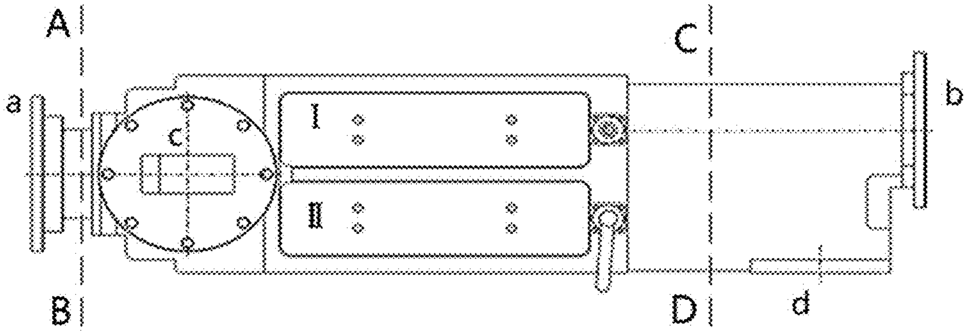
FIG. 5 is a structure diagram of a four-port circulator in some embodiments according to a radiation inspection system of the present disclosure.

FIG. 3 is a block schematic diagram of a single ray source in some other embodiments of a radiation inspection system of the present disclosure. FIG. 4 is a schematic diagram showing beam exit manners of two accelerating tubes at different moments according to some embodiments of the radiation inspection system of the present disclosure. FIG. 5 is a structure diagram of a four-port circulator in some embodiments according to a radiation inspection system of the present disclosure. Referring to FIG. 3, in some embodiments, the electronic beam generating device 2 includes a first electronic gun 122, a first electronic gun power source 121, a second electronic gun 124, and a second electronic gun power source 123. The first electronic gun 122 is configured to generate a first electronic beam. The second electronic gun 124 is configured to generate a second electronic beam. Each electronic gun power source and the microwave generating device may be powered by the same AC power source (e.g., 380V).

The first electronic gun power source 121 is in signal connection with the controller 11 and connected to the first electronic gun 122, and is configured to adjust the beam loading of the first electronic beam according to a chronological control signal provided by the controller 11. The second electronic gun power source 123 is in signal connection with the controller 11 and connected to the second electronic gun 124, and is configured to adjust the beam loading of the second electronic beam according to a chronological control signal provided by the controller 11. The controller 11 may adjust voltages applied to the electronic guns by sending a chronological control signal (e.g., pulse width modulation signal) to the electronic gun power sources to further adjust the beam loadings of the electronic beams.

Referring to FIG. 3 and FIG. 5, in some embodiments, at least two power output ports of the microwave circulator 15 include a first power output port b and a second power output port c, the first power output port b is allocated with a microwave signal fed from the power input port a, and the second power output port c is allocated with a microwave signal fed from the first power output port b. The microwave signal fed from the first power output port b may be a reflected microwave signal that is reflected back after being output from the first power output port b.

In FIG. 3, the plurality of accelerating tubes 13 include a first accelerating tube 131 and a second accelerating tube 132. The first accelerating tube 131 is connected to the first power output port b and the first electronic gun 122, and is configured to accelerate the first electronic beam through a first output microwave signal output by the first power output port b. The second accelerating tube 132 is connected to the second power output port c and the second electronic gun 124, and is configured to accelerate the second electronic beam through a second output microwave signal output by the second power output port c. The accelerated first and second electronic beams may generate X-rays of different energies by bombarding a target.

In some other embodiments, the electronic beam generating device may include more than three electronic guns and corresponding electronic gun power sources thereof, and the ray generating device includes more than three accelerating tubes. Accordingly, the accelerating tubes are connected to more than three power output ports of the microwave circulator, respectively, to realize output of more types of ray energies through the chronological control of the controller and implement the multi-energy spectrum inspection requirements and multi-viewpoint scanning requirements to the objects.

Referring to FIG. 3, in some embodiments, at least two power output ports of the microwave circulator 15 further include a third power output port d. The third power output port d is allocated with a microwave signal fed from the second power output port c. The microwave signal fed from the second power output port c may be a reflected microwave signal that is reflected back after being output from the second power output port c. The ray generating device may further include an absorbing load 6 connected to the third power output port d. The absorbing load can absorb the microwave signal output from the third power output port d to realize an isolation effect to prevent the microwave signal from returning to the power input port of the microwave circulator.

Referring to FIG. 5, in some embodiments, the microwave circulator 15 includes a four-port circulator 151. The four-port circulator 151 has four ports, which are a power input port a, a first power output port b, a second power output port c and a third power output port d in the power transmission sequence, respectively, that is, the power transmission rule of the four-port circulator 151 is a→b→c→d. In some other embodiments, the microwave circulator 15 may further include a combination structure of a plurality of three-port circulators and four-port circulators connected in series.

FIG. 5 illustrates the structure of a ferrite four-port circulator. The four-port circulator is a coupled device including a dual-T joint, a nonreciprocal phase shifter based on ferrite field-displacement effect, and a 3 dB coupler. During the operation of the ray generating device, an electromagnetic wave of which the amplitude is $E_0$ is fed from the power input port a. Due to the dual-T (H branch) characteristic, electromagnetic waves with equal amplitude of $E_0/(2^(1/2))$ and equal phase will be output from waveguides I and II at side A-B. The nonreciprocal phase shifter can allow phase of the electromagnetic wave in the waveguide I to be 90° ahead relative to that in the waveguide II when the electromagnetic wave is forwardly transmitted from side A-B to side C-D (and conversely, the phase in the waveguide II is 90° ahead relative to the phase in the waveguide I if it is reversely transmitted from side C-D to side A-B), and the 3 dB coupler from side C-D to a location between the first power output port b and the third power output port d can cause the microwave power in the waveguides I and II to be equally divided to the first power output port b and the third power output port d, respectively, but the phase shift is increased by 90° during the coupling transmission, and all microwave power output from the waveguide I and the waveguide II to the first power output port b and the third power output port d, respectively, is output from the first power output port b, but is not output at the third power output port d.

Similarly, the microwave power input from the first power output port b is allocated to the second power output port c for output, and the microwave power input from the second power output port c is allocated to the third power output port d for output. Accordingly, the reflected microwave input from the first power output port b is allocated to the second power output port c for output, and the reflected wave from the second power output port c will be transmitted to the third power output port d and absorbed by the absorbing load.

Referring to FIG. 4, in some embodiments, through the chronological control of the controller 11, the first accelerating tube connected to the first power output port b is caused to obtain larger power and energy to output at least one type of X-rays with a higher energy, for example, X-ray pulses with output energies of 6 MeV and 3 MeV alternately at times $t_1$, $t_3$, $t_5$ and $t_7$; and through the chronological control of the controller 11, the second accelerating tube connected to the second power output port c is caused to obtain smaller power and energy to output at least one type of X-rays with a lower energy, such as X-ray pulses with output energies of 0.3 to 0.6 MeV at the time $t_0$, $t_2$, $t_4$ and $t_6$. In this way, the effect of power allocation is achieved by differences of the microwave power output from different power output ports of the microwave circulator, and accelerating tubes with different energies can be driven by utilizing the power allocation characteristic of the microwave circulator, to satisfy various inspection needs.

Figure 6:
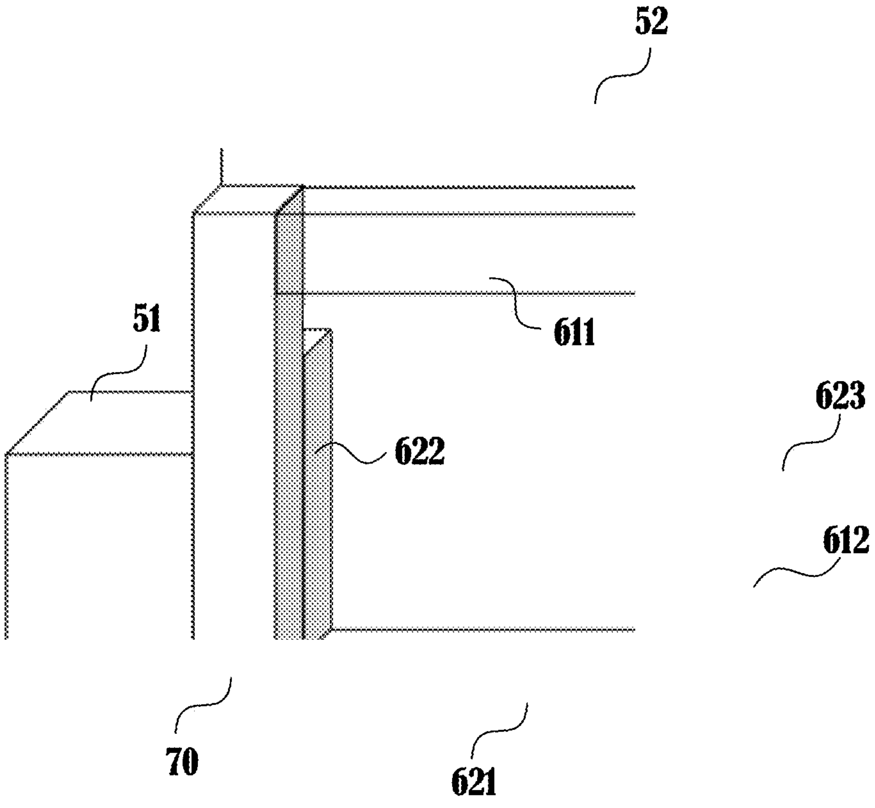
FIG. 6 is a structural schematic diagram according to some embodiments of a radiation inspection system of the present disclosure.
Figure 7:
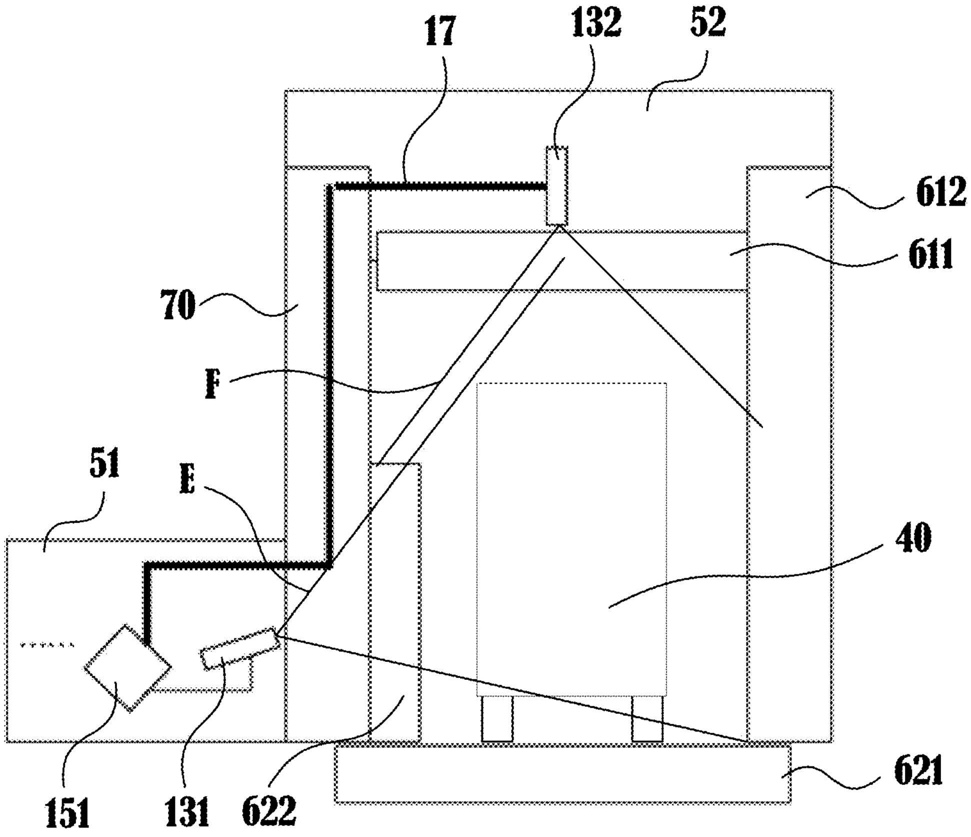
FIG. 7 is a schematic diagram of beam exit ranges of two accelerating tubes in an embodiment as shown in FIG. 6.

FIG. 6 is a structural schematic diagram according to some embodiments of a radiation inspection system of the present disclosure. FIG. 7 is a schematic diagram of beam exit ranges of two accelerating tubes in an embodiment as shown in FIG. 6. Referring to FIG. 6 and FIG. 7, in some embodiments, the beam exit direction of the first accelerating tube 131 is different from the beam exit direction of the second accelerating tube 132, and the first accelerating tube 131 and the second accelerating tube 132 exit beams at different moments. The radiation inspection system further includes: a first accelerator chamber 51, a second accelerator chamber 52, at least one first detector arm 61 and at least one second detector arm 62. The first accelerator chamber 51 accommodates the first accelerating tube 131. The second accelerator chamber 52 accommodates the second accelerating tube 132. For example, in FIG. 6 and FIG. 7, when the inspected object 40 enters a scanning channel, the first accelerator chamber 51 is located on a left side or a right side of the inspected object 40, and the second accelerator chamber 52 is located above the inspected object 40.

The electronic beam generating device 12, the microwave generating device 14 and the microwave circulator 15 can all be located in one of the first accelerator chamber 51 and the second accelerator chamber 52. For example, the electronic beam generating device 12, the microwave generating device 14 and the microwave circulator 15 are all arranged in the first accelerator chamber 51, while the second accelerating tube 132 is connected with a second power output port c of the four-port circulator 151 through a waveguide 17, to effectively simplify the structure of the second accelerator chamber 52 and reducing its weight. The first accelerating tube 131 is connected with the microwave circulator 15 in the first accelerator chamber 51 through a waveguide.

The detector 30 includes a plurality of detector arrays. At least one first detector arm 61 is mounted with a portion of the plurality of detector arrays. At least one second detector arm 62 is mounted with another portion of the plurality of detector arrays. The detector array on at least one first detector arm 61 can be matched with the first accelerating tube 131, to generate a scanned image of the inspected object in a horizontal view through received detection signals, while the detector array on at least one second detector arm 62 can be matched with the first accelerating tube 131, to generate a scanned image of the inspected object in a vertical view through received detection signals.

Referring to FIG. 4, the first accelerating tube 131 and the second accelerating tube 132 exit beams at different moments, and the scanned image at a horizontal view and the scanned image at a vertical view do not interfere with each other. When the inspected object is scanned from multiple angles, compared with overlapped substance images within the scanned image in a ray path when the inspected object is scanned at a single angle, scanning from multiple angles can dramatically improve image quality and realize more comprehensive scanning effect.

To eliminate mutual interference of scanned images formed at different angles, in some embodiments, the first accelerator chamber 51 and the at least one first detector arm 61 are located in the first plane, the second accelerator chamber 52 and the at least one second detector arm 62 are located in the second plane, and the first plane is not coplanar with the second plane. Referring to FIG. 7, the first plane is just the ray beam surface E emitted by the first accelerating tube 131, and the second plane is just the ray beam surface F emitted by the second accelerating tube 132. Further, the first plane can be parallel to the second plane, to further eliminate mutual interference of detection signals respectively received by the first detector arm 61 and the second detector arm 62.

In FIG. 6, the at least one first detector arm 61 includes a first detector cross arm 611 and a first detector vertical arm 612, and the at least one second detector arm 62 includes a second detector cross arm 621, a second detector vertical arm 622 and a third detector vertical arm 623. The radiation inspection system further includes a supporting structure 70. The first accelerator chamber 51, the second accelerator chamber 52, the first detector cross arm 611 and the second detector vertical arm 622 are all connected with the supporting structure 70, the first detector vertical arm 612 is located in opposed position of the supporting structure 70, the second detector cross arm 621 is located on an underside of the second accelerator chamber 52, and the third detector vertical arm 623 is located in opposed position of the second detector vertical arm 622.

Wiring between different components can be arranged within the above accelerator chamber, the detector arm, and the supporting structure. For example, a waveguide between the second accelerating tube 132 and the microwave circulator 15 can be arranged within the supporting structure 70, to be beneficial for wiring and making signal transmission more stable and reliable.

In some other embodiments, the first accelerating tube 131 and the second accelerating tube 132 may adopt other ray emission angles, such as a horizontal angle and an angle that is 45 degrees obliquely upward, respectively.

Figure 8:
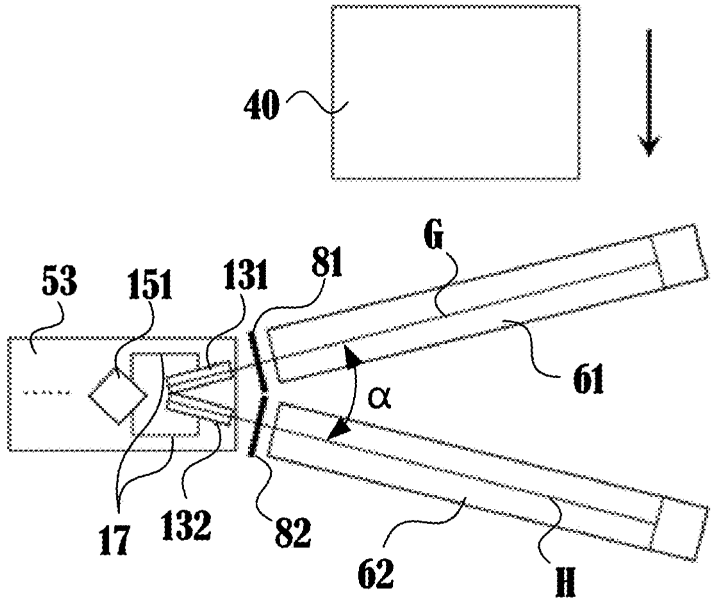
FIG. 8 is a structural schematic diagram according to some other embodiments of the radiation inspection system of the present disclosure.

FIG. 8 is a structural schematic diagram according to some other embodiments of the radiation inspection system of the present disclosure. As shown in FIG. 8, the radiation inspection system of the present disclosure can also adopt a binocular visual system. In some embodiments, the radiation inspection system further includes: a single accelerator chamber 53, at least one first detector arm 61, at least one second detector arm 62, a first collimator 81 and a second collimator 82. The single accelerator chamber 53 accommodates the first accelerating tube 131 and the second accelerating tube 132. The electronic beam generating device 12, the microwave generating device 14 and the microwave circulator 15 are all located in the single accelerator chamber 53, therefore, the system structure is more compact and the weight is lighter.

The beam exit direction of the first accelerating tube 131 is different from the beam exit direction of the second accelerating tube 132, and the first accelerating tube 131 and the second accelerating tube 132 exit beams at different moments. The first accelerating tube 131 and the second accelerating tube 132 exit beams at different moments, and the scanned image at a horizontal view and the scanned image at a vertical view do not interfere with each other.

The detector 30 may include a plurality of detector arrays. At least one first detector arm 61 is mounted with a portion of the plurality of detector arrays. At least one second detector arm 62 is mounted with another portion of the plurality of detector arrays. In the present embodiment, the first detector arm 61 can include a detector cross arm and a detector vertical arm, and the second detector arm 62 can also include a detector cross arm and a detector vertical arm. The first detector arm 61 and the second detector arm 62 can also only include the detector cross arm or the detector vertical arm.

The first collimator 81 is located between the first accelerating tube 131 and the at least one first detector arm 61, and is configured to collimate a ray generated by the first accelerating tube 131 to at least one first detector arm 61. The second collimator 82 is located between the second accelerating tube 132 and the at least one second detector arm 62, and is configured to collimate a ray generated by the second accelerating tube 132 to at least one second detector arm 62.

Detection signals received by detector arrays respectively mounted on the first detector arm and the second detector arm can form three-dimensional signals through mathematical treatment, to solve the problem of incapability in distinguishing true shape and material of the inspected object due to overlapped images of inspected objects caused by single-view observation. Moreover, the capability in distinguishing inspected objects is further improved through respectively realizing scanning of rays with different energies in a binocular visual system.

In FIG. 8, at a vertical view from top to bottom, the first accelerating tube 131, the first collimator 81 and the at least one first detector arm 61 are located in a third plane, the second accelerating tube 132, the second collimator 82 and the at least one second detector arm 62 are located in a fourth plane, and the third plane forms an acute angle with the fourth plane. In this way, when the inspected object 40 passes through the scanned channel, each part of the inspected object 40 can be scanned respectively from two angles, and a three-dimensional scanned image is possibly obtained. The third plane is just the ray beam plane G emitted by the first accelerating tube 131, and the fourth plane is just the ray beam plane H emitted by the second accelerating tube 132.

Figure 9:
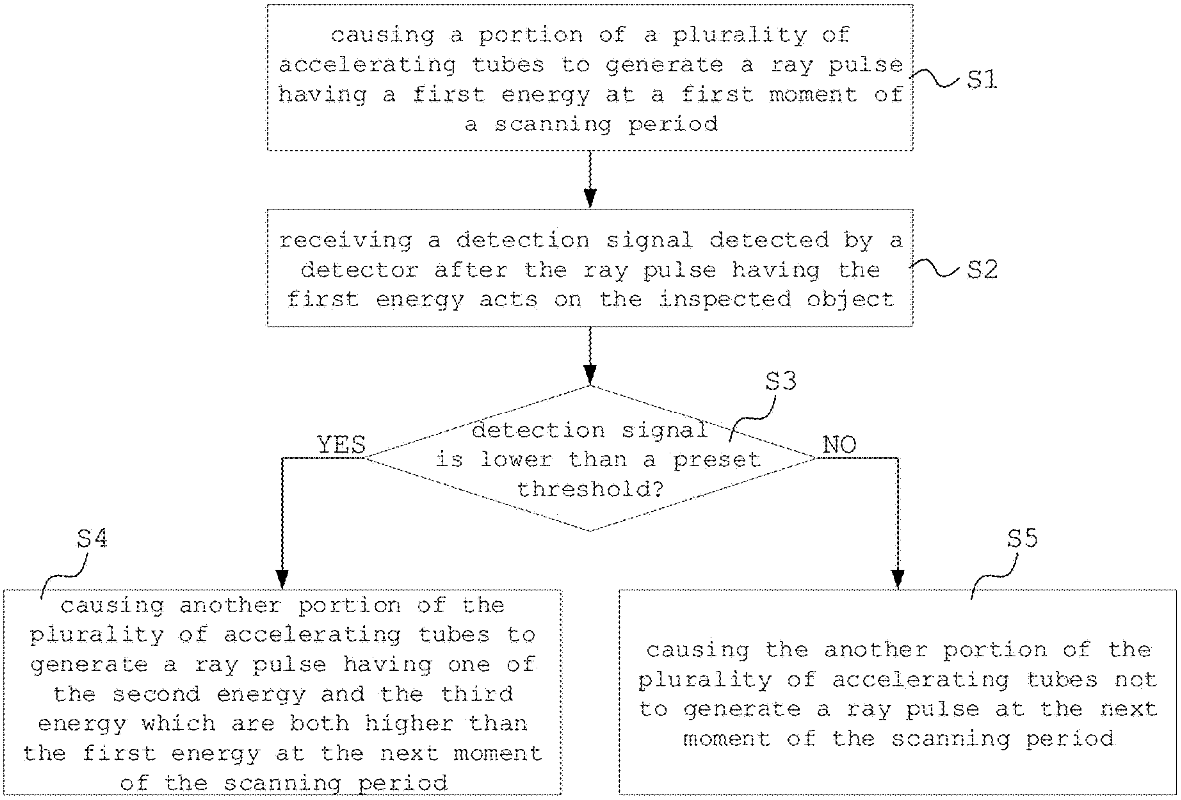
FIG. 9 is a schematic flowchart according to some embodiments of a radiation inspection method of the present disclosure.
Figure 10:
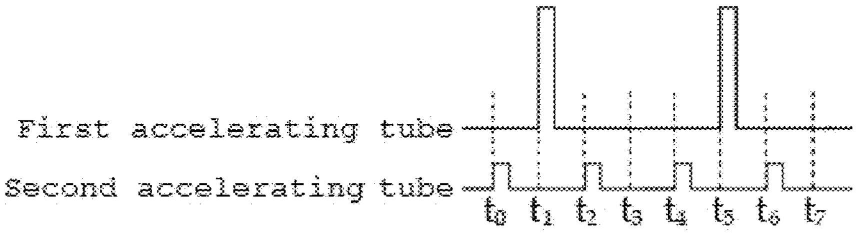
FIG. 10 is a schematic diagram showing beam exit manners of two accelerating tubes at different moments according to some other embodiments of the radiation inspection system of the present disclosure.

Based on each embodiment of the above radiation inspection system, the present disclosure further provides a corresponding radiation inspection method. FIG. 9 is a schematic flowchart according to some embodiments of a radiation inspection method of the present disclosure. FIG. 10 is a schematic diagram showing beam exit manners of two accelerating tubes at different moments according to some other embodiments of the radiation inspection system of the present disclosure. Referring to FIG. 9, in some embodiments, the radiation inspection method of the above radiation inspection system includes: step S1 to step S5. In the step S1, a portion of the plurality of accelerating tubes 13 is caused to generate a ray pulse having a first energy at a first moment of the scanning period. In the step S2, a detection signal detected by the detector 30 is received after the ray pulse having the first energy acts on the inspected object 40. In the step S3, whether the detection signal is lower than a preset threshold is judged, if the detection signal is lower than a preset threshold, then performing step S4, otherwise, performing step S5. The step of judging the relationship between detection signals and the preset threshold herein can be determined according to magnitude of gray values of scanned images.

In the step S4, another portion of the plurality of accelerating tubes 13 is caused to generate a ray pulse having one of the second energy and the third energy which are both higher than the first energy at the next moment of the scanning period. In the step S5, another portion of the plurality of accelerating tubes 13 is caused to not generate a ray pulse at the next moment of the scanning period.

For example, the single ray source emits ray pulses having the first energy (less than 1 MeV) at moment $t_0$, if corresponding detection signals detected by the detector are in a normal range, it represents that the ray pulses having the first energy can implement the requirement of radiation imaging, no ray pulses having greater energies need to be used for scanning, to save energy and reducing dosage of radiation applied to the inspected object. If the corresponding detection signals detected by the detector are lower than a preset threshold (the preset threshold can be determined according to such factors as imaging quality), it represents that the ray pulses having the first energy cannot implement the requirements of radiation imaging, then the single ray source emits ray pulses having the second energy or the third energy (the second energy and the third energy are both greater than 1 MeV, and the second energy is lower than the third energy) at the next moment ($t_1$ moment), to improve capability of rays in penetrating through inspected objects and improving imaging quality.

In FIG. 10, ray pulses having a first energy can be emitted by the second accelerating tube at equal time intervals at $t_0$, $t_2$, $t_4$, and $t_6$, and the first accelerating tube cannot emit beams at the next moment (i.e., $t_3$ and $t_7$) after the detection signal is normal, and the first accelerating tube can emit ray pulses having higher second energy or third energy at the next moment (i.e., $t_1$ and $t_5$) after the detection signal is lower than the preset threshold.

Multiple embodiments in the present specification are described in a progressive manner, and each embodiment has different emphases, while the same or similar parts between each embodiment can be referred to each other. For method embodiments, since the whole and the steps involved are corresponding to the contents of the system embodiments, the description is relatively simple, and for related parts, please refer to part of the description of the system embodiments.

So far, various embodiments of the present disclosure have been described in detail. In order to avoid obscuring concepts of the present disclosure, some details that are well known in the art have not been described.

Although some specific embodiments of the present disclosure have been described in detail through examples, it should be understood that the above examples are only for illustration and are not intended to limit the scope of the present disclosure. The above embodiments can be modified or some features can be replaced by equivalents without departing from the scope and spirit of the present disclosure. The scope of the present disclosure is defined by appended claims.

What is claimed is:

1. A radiation inspection system, comprising:

a single ray source having a plurality of accelerating tubes, wherein the plurality of accelerating tubes respectively generate a plurality of rays having different energies, and beam exit directions of the plurality of accelerating tubes comprise at least two different beam exit directions;

a plurality of detectors configured to detect a signal when rays emitted by the single ray source act on the inspected object; and a processor in communication connection with the single ray source and configured to respectively control the plurality of accelerating tubes, wherein the single ray source further comprises:

an electronic beam generating device configured to generate a plurality of electronic beams;

a microwave generating device configured to generate a microwave, a microwave circulator having a power input port and at least two power output ports, the power input port being connected with the microwave generating device through a waveguide structure; and a controller in signal connection with the processor the electronic beam generating device and the microwave generating device and configured to perform, according to instructions of the processor, chronological control on microwave power of the microwave generating device and perform chronological control on beam loadings generated by the electronic beam generating device and respectively corresponding to electronic beams of the plurality of accelerating tubes, wherein the plurality of accelerating tubes are connected with the electronic beam generating device, and are respectively connected with the at power output ports, and are configured to respectively receive a plurality of electronic beams generated by the electronic beam generating device, and respectively accelerate the plurality of electronic beams through microwaves received from the at least two power output ports, wherein to respectively generate a plurality of radiation pulses having different radiation energies.

2. The radiation inspection system according to claim 1, wherein a portion of the plurality of accelerating tubes is configured to generate a ray pulse having a first energy, another portion of the plurality of accelerating tubes is configured to selectively generate a ray pulse having a second energy and a ray pulse having a third energy, the first energy is lower than the second energy, and the second energy is lower than the third energy.

3. The radiation inspection system according to claim 2, wherein the first energy is less than 1 MeV, the second energy and the third energy are both greater than 1 MeV.

4. The radiation inspection system according to claim 1, wherein the single ray source comprises:

a first electronic gun configured to generate a first electronic beam;

a first electronic gun power source in signal connection with the controller and connected with the first electronic gun and configured to adjust a beam loading of the first electronic beam according to a chronological control signal provided by the controller;

a second electronic gun configured to generate a second electronic beam; and a second electronic gun power source in signal connection with the controller, connected with the second electronic gun and configured to adjust a beam loading of the second electronic beam according to a chronological control signal provided by the controller, wherein the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

5. The radiation inspection system according to claim 4, wherein at least two power output ports of the microwave circulator comprise a first power output port and a second power output port, the first power output port is allocated with a microwave signal fed from the power input port, and the second power output port is allocated with a microwave signal fed from the first power output port; and the plurality of accelerating tubes comprise:

a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

6. The radiation inspection system according to claim 5, wherein at least two power output ports of the microwave circulator further comprise a third power output port which is allocated with a microwave signal fed from the second power output port; and the single ray source further comprises: an absorbing load connected with the third power output port and configured to absorb a microwave signal output by the third power output port.

7. The radiation inspection system according to claim 6, wherein the microwave circulator comprises a four-port circulator.

8. The radiation inspection system according to claim 6, wherein the controller is configured to allow a microwave signal fed by the microwave generating device to the power input port of the microwave circulator to comprise at least one first input microwave signal at the first time period, and to allow the microwave signal fed by the microwave generating device to the power input port of the microwave circulator to comprise at least one second input microwave signal at the second time period, and a power of the at least one first input microwave signal is greater than that of the at least one second input microwave signal.

9. The radiation inspection system according to claim 1, wherein the microwave generating device comprises a magnetron.

10. The radiation inspection system according to claim 5, wherein a beam exit direction of the first accelerating tube is different from a beam exit direction of the second accelerating tube, and the first accelerating tube and the second accelerating tube exit beams at different moments; and the detector comprises a plurality of detector arrays; and the radiation inspection system further comprises:

a first accelerator chamber accommodating the first accelerating tube;

a second accelerator chamber accommodating the second accelerating tube;

at least one first detector arm mounted with a portion of the plurality of detector arrays; and at least one second detector arm mounted with another portion of the plurality of detector arrays, wherein the electronic beam generating device, the microwave generating device and the microwave circulator are all located in one of the first accelerator chamber and the second accelerator chamber.

11. The radiation inspection system according to claim 10, wherein the first accelerator chamber and the at least one first detector arm are located in a first plane, the second accelerator chamber and the at least one second detector arm are located in a second plane, and the first plane is not coplanar with the second plane.

12. The radiation inspection system according to claim 11, wherein the first plane is parallel to the second plane.

13. The radiation inspection system according to claim 10, wherein the at least one first detector arm comprises a first detector cross arm and a first detector vertical arm, and the at least one second detector arm comprises a second detector cross arm, a second detector vertical arm and a third detector vertical arm; and the radiation inspection system further comprises a supporting structure, the first accelerator chamber, the second accelerator chamber, the first detector cross arm and the second detector vertical arm are all connected with the supporting structure, the first detector vertical arm is located in opposed position of the supporting structure, the second detector cross arm is located on an underside of the second accelerator chamber, and the third detector vertical arm is located in opposed position of the second detector vertical arm.

14. The radiation inspection system according to claim 5, wherein a beam exit direction of the first accelerating tube is different from a beam exit direction of the second accelerating tube, and the first accelerating tube and the second accelerating tube exit beams at different moments; and the detector comprises a plurality of detector arrays, and the radiation inspection system further comprises:

a single accelerator chamber accommodating the first accelerating tube and the second accelerating tube;

at least one first detector arm mounted with a portion of the plurality of detector arrays;

at least one second detector arm mounted with another portion of the plurality of detector arrays;

a first collimator located between the first accelerating tube and the at least one first detector arm, and configured to collimate a ray generated by the first accelerating tube to the at least one first detector arm; and a second collimator located between the second accelerating tube and the at least one second detector arm, and configured to collimate a ray generated by the second accelerating tube to the at least one second detector arm, wherein the electronic beam generating device, the microwave generating device and the microwave circulator are all located in the single accelerator chamber.

15. The radiation inspection system according to claim 14, wherein the first accelerating tube, the first collimator and the at least one first detector arm are located in a third plane, the second accelerating tube, the second collimator and the at least one second detector arm are located in a fourth plane, and the third plane forms an acute angle with the fourth plane.

16. The radiation inspection system according to claim 1, wherein the single ray source is an electron linear accelerator.

17. A radiation inspection method of the radiation inspection system according to claim 1, comprising:

causing a portion of a plurality of accelerating tubes to generate a ray pulse having a first energy at a first moment of a scanning period; and receiving a detection signal detected by a detector after the ray pulse having the first energy acts on the inspected object, and judging whether the detection signal is lower than a preset threshold, if the detection signal is lower than the preset threshold, then causing another portion of the plurality of accelerating tubes to generate a ray pulse having one of the second energy and the third energy which are both higher than the first energy at the next moment of the scanning period; if the detection signal is not lower than the preset threshold, causing the another portion of the plurality of accelerating tubes not to generate a ray pulse at the next moment of the scanning period.

18. The radiation inspection method according to claim 17, wherein the first energy is less than 1 MeV, the second energy and the third energy are both greater than 1 MeV, and the second energy is lower than the third energy.

* * * * *